United States Patent
Ishikawa et al.

(10) Patent No.: US 8,870,016 B2
(45) Date of Patent: Oct. 28, 2014

(54) HEAT-INSULATING PACKAGING FILM, PACKAGING BAG, AND PACKAGING BAG HAVING OPENING MEMBER

(75) Inventors: Daisaku Ishikawa, Fujimi (JP); Tomonari Shinohara, Iruma-gun (JP); Yukio Kobayashi, Tokyo (JP); Hidekazu Tanaka, Higashikagawa (JP); Takashi Maru, Urayasu (JP); Hiroshi Kohno, Higashikagawa (JP); Masayuki Akamatsu, Higashikagawa (JP)

(73) Assignee: Hosokawa Yoko Co., Ltd., Tokyo (JP)

( * ) Notice: Subject to any disclaimer, the term of this patent is extended or adjusted under 35 U.S.C. 154(b) by 0 days.

(21) Appl. No.: 13/806,095

(22) PCT Filed: Jun. 24, 2011

(86) PCT No.: PCT/JP2011/064552
§ 371 (c)(1),
(2), (4) Date: Mar. 11, 2013

(87) PCT Pub. No.: WO2011/162383
PCT Pub. Date: Dec. 29, 2011

(65) Prior Publication Data
US 2013/0200085 A1    Aug. 8, 2013

(30) Foreign Application Priority Data

Jun. 25, 2010  (JP) ................ 2010-145070

(51) Int. Cl.
| B65D 81/38 | (2006.01) |
| B32B 7/12 | (2006.01) |
| B32B 27/32 | (2006.01) |
| B32B 5/20 | (2006.01) |
| B32B 27/06 | (2006.01) |
| B32B 27/36 | (2006.01) |

(52) U.S. Cl.
CPC ......... B65D 81/3897 (2013.01); *B32B 2250/24* (2013.01); *B32B 7/12* (2013.01);
(Continued)

(58) Field of Classification Search
CPC ............ B65D 81/3897; B65D 81/389; B65D 81/3888; B65D 31/04; B32B 5/18
USPC ................ 220/592.26, 592.25, 592.2, 62.22, 220/62.21, 62.15, 62.12, 592.01, 62.11; 428/304.4, 315.5; 383/110, 109
See application file for complete search history.

(56) References Cited

U.S. PATENT DOCUMENTS 3,065,190 A * 11/1962 Price et al. .................. 521/81
4,284,674 A *  8/1981 Sheptak ....................... 428/69

(Continued)

FOREIGN PATENT DOCUMENTS

CN        2530801 Y     1/2003
CN      101531770 B    11/2011

(Continued)

OTHER PUBLICATIONS

Translation of JP 62214930 (Murata et al.) Sep. 21, 1987, Abstract.*

(Continued)

*Primary Examiner* — Robert J Hicks
(74) *Attorney, Agent, or Firm* — Nixon Peabody LLP

(57) ABSTRACT

A thermal insulating packaging film which includes: a base material; and an open-cell layer disposed on one face of the base material and made of polyolefin. The open-cell layer in the thermal insulating packaging film preferably has an average bore diameter of 150 μm to 500 μm.

7 Claims, 3 Drawing Sheets

(52) U.S. Cl.
CPC ....... *B32B 2307/304* (2013.01); *B32B 2307/31* (2013.01); *B32B 2307/75* (2013.01); *B32B 27/32* (2013.01); *B32B 2266/06* (2013.01); *B32B 2305/022* (2013.01); *B32B 2250/03* (2013.01); *B32B 2307/518* (2013.01); *B32B 5/20* (2013.01); *B32B 27/065* (2013.01); *B32B 2307/558* (2013.01); *B32B 2266/025* (2013.01); *B32B 27/36* (2013.01)
USPC ................. 220/592.26; 220/592.2; 428/304.4

(56) References Cited

U.S. PATENT DOCUMENTS

| | | | | |
|---|---|---|---|---|
| 4,390,552 | A * | 6/1983 | Niwa | 426/126 |
| 4,661,401 | A * | 4/1987 | Akao | 428/215 |
| 6,313,226 | B1 * | 11/2001 | Yasaka et al. | 525/240 |
| 2004/0126560 | A1 | 7/2004 | Brandolini et al. | |
| 2005/0181196 | A1 * | 8/2005 | Aylward et al. | 428/304.4 |
| 2006/0266775 | A1 * | 11/2006 | Niwa | 222/575 |
| 2009/0209670 | A1 * | 8/2009 | Kanae et al. | 521/97 |
| 2011/0287260 | A1 * | 11/2011 | Sandler et al. | 428/402 |

FOREIGN PATENT DOCUMENTS

| | | | |
|---|---|---|---|
| EP | 1 291 300 | A2 | 3/2003 |
| JP | 47-43181 | | 10/1972 |
| JP | 49-2182 | | 1/1974 |
| JP | 59-164728 | A | 5/1984 |
| JP | 62214930 | A * | 9/1987 |
| JP | 2001-130586 | A | 5/2001 |
| JP | 2008-037069 | A | 2/2008 |
| WO | 99/61520 | A1 | 12/1999 |

OTHER PUBLICATIONS

Translation of JP 2008037069 (Nissei Kagaku Kabushiki Kaisha) Feb. 21, 2008, Paragraphs 8, 11, 12, and 25.*
International Search Report, PCT/JP2011/064552, dated Aug. 16, 2011.
Office Action in Chinese Application No. 201180030032.0, mailed Jan. 17, 2014.
Decision of Rejection in Japanese Application No. 2012-521550, mailed Mar. 18, 2014.
Extended European Search Report in European Patent Application No. 11798264.5, dated Jul. 9, 2014.

* cited by examiner

HEAT-INSULATING PACKAGING FILM, PACKAGING BAG, AND PACKAGING BAG HAVING OPENING MEMBER

CROSS REFERENCE TO RELATED APPLICATIONS OR PRIORITY CLAIM

This application is a National Phase of PCT/JP2011/064552, filed Jun. 24, 2011, entitled, "HEAT-INSULATING PACKAGING FILM, PACKAGING BAG, AND PACKAGING BAG HAVING OPENING MEMBER" which claims the benefit of Japanese Patent Application No. 2010-145070, filed Jun. 25, 2010, the contents of which are incorporated herein by reference in their entirety.

TECHNICAL FIELD

The present invention relates to a heat-insulating (thermal insulating) packaging film for a packaging bag to contain food such as frozen desserts requiring a thermal insulating property therein. In addition, the present invention relates to a packaging bag and a packaging bag having an opening member (a spout) for food such as frozen desserts requiring a thermal insulating property.

BACKGROUND ART

Conventionally, frozen desserts such as ice cream have been packed in a cup- or tube-type receptacle when sold. However, such a tube-type receptacle packed with a frozen dessert has encountered problems of chilling a hand of a consumer when he or she holds the receptacle in his or her hand. In addition, although the cup-type receptacle does not chill the hand to such an extent as the tube-type receptacle, it has also encountered a problem in that both hands are needed to eat the food in the receptacle.

In recent years, a gusset packaging bag having a thermal insulating film has been used as a receptacle for packaging frozen desserts therein. As the thermal insulating film, a foamed resin layer has been disclosed in Patent Document 1.

PRIOR ART DOCUMENT

Patent Document

Patent Document 1:
Japanese Unexamined Patent Application, First Publication No. 2001-130586

SUMMARY OF THE INVENTION

Problems to be Solved by the Invention

However, since the packaging bag described in Patent Document 1 has a foamed resin layer with a thickness of 500 μm, compared to a general packaging film with a thickness of about 30 μm to about 200 μm, it has a problem in that the thickness of the packaging bag is considerably large. In other words, it is preferable that the thickness of the foamed resin layer be reduced as much possible, in consideration of depletion and recycling of fossil fuels.

In consideration of the above-mentioned circumstances, it is an object of the present invention to provide a thermal insulating packaging film, a packaging bag, and a packaging bag having an opening member (a spout) which have a sufficiently high thermal insulating property and enable a decrease in weight thereof.

Means for Solving the Problems

[1] A thermal insulating packaging film including a base material and an open-cell (continuously foamed) layer disposed on one face of the base material and made of polyolefin.
[2] A thermal insulating packaging film including a base material and an open-cell layer disposed on one face of the base material and made of polyolefin, wherein an average bore diameter of an opening of the open-cell layer is larger than a thickness of the open-cell layer.
[3] In the above thermal insulating packaging film, the average bore diameter of the opening in the open-cell layer may range from 150 μm to 500 μm.
[4] In the above thermal insulating packaging film, a foaming rate of the open-cell layer may range from 1.2 to 3.5 times.
[5] In the above thermal insulating packaging film, the film may include a non-foamed sealant layer disposed on the opposite side of the open-cell layer to the base material.
[6] In the above thermal insulating packaging film, a thickness of the open-cell foamed layer may range from 70 μm to 250 μm.
[7] A packaging bag formed by heat-sealing the thermal insulating packaging film according to any one of the above [1] to [6].
[8] A packaging bag having an opening member (a spout), including the packaging bag according to the above [7]; and an opening member (a spout) attached to the packaging bag to communicate an inner side with an outer side thereof.

Effect of the Invention

The thermal insulating packaging film, the packaging bag, and the packaging bag having an opening member (a spout) of the present invention have a sufficiently high thermal insulating property.

MODES FOR CARRYING OUT THE INVENTION

Thermal Insulating Packaging Film
Hereinafter, an exemplary embodiment of a thermal insulating packaging film of the present invention will be described in detail.

Figure 1:
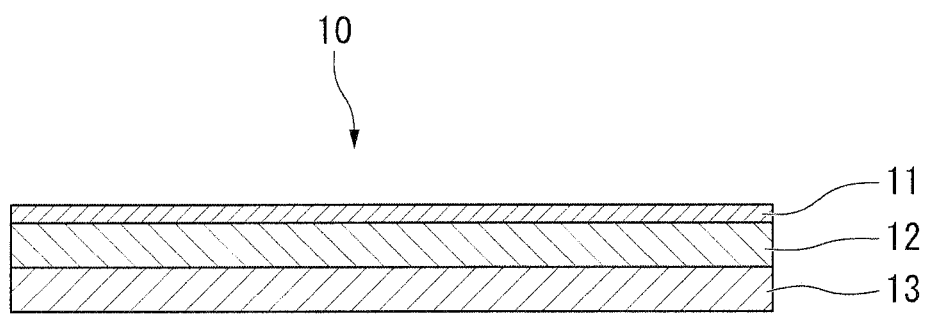
FIG. 1 is a cross-sectional view illustrating an exemplary embodiment of a thermal insulating packaging film of the present invention.

FIG. 1 shows a thermal insulating packaging film 10 according to an exemplary embodiment of the present invention. The thermal insulating packaging film 10 according to the present embodiment includes a base material 11, an open-cell layer 12 contacting the base material 11, and a sealant layer 13 disposed on the opposite side of the open-cell layer 12 to the base material 11.

Base Material
The base material 11 is a film having mechanical strength and is disposed on the surface when it is used.

The film used for the base material 11 may include a synthetic resin film, for example, polyamide, polyethylene terephthalate, polypropylene, ethylene vinyl alcohol copolymer, polycarbonate, polyacetal, or the like. Alternatively, the film used for the base material 11 may include a laminate film prepared by stacking the synthetic resin described above into multiple layers and extruding the layers under high pressure. The above films may be a non-stretched film or a mono- or bi-axially stretched film. In view of printability, the mono- or bi-axially stretched film is preferably used. Further, among the above synthetic resins which form a film, polyethylene terephthalate is preferably used in view of printability and impact resistance.

The base material 11 may have a thickness of 6 µm to 50 µm, more preferably, 9 µm to 25 µm. When the thickness of the base material 11 is 6 µm or more, the strength of the thermal insulating packaging film 10 may be increased. When the thickness of the base material 11 is 50 µm or less, the thermal insulating packaging film 10 may have flexibility.

Open-Cell Layer

Figure 2:
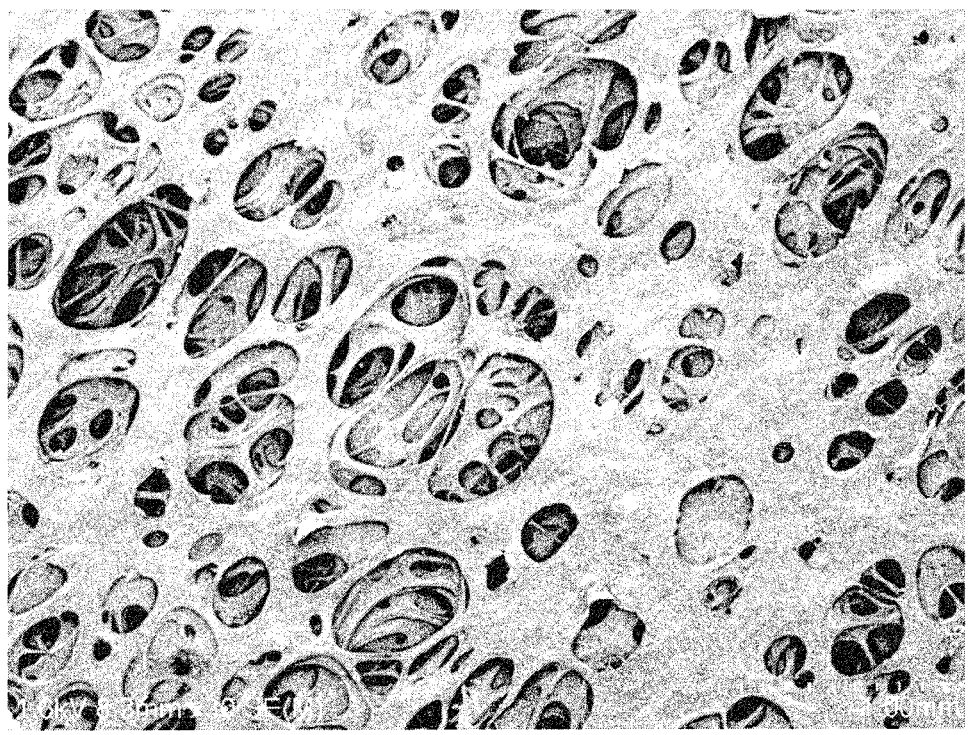
FIG. 2 is a scanning electron microscope (SEM) photograph of an open-cell layer.

The open-cell layer 12 is formed of stacked mesh-type layers, as shown in the SEM photograph of FIG. 2, and is substantially a polyolefin foamed layer having continuous bubbles communicating or unified therein. In other words, the open-cell layer 12 includes several openings on the surface thereof, as well as an air layer therein.

Polyolefin used for the open-cell layer 12 may include, for example, low-density polyethylene, linear low-density polyethylene, medium-density polyethylene, high-density polyethylene, polypropylene, or the like.

Meanwhile, the open-cell layer 12 may be formed using a base resin in a simple substance form. Alternatively, in order to promote formation of continuous foam, the base resin may be mixed with a foaming promotion resin with a relatively low melt tension compared to the base resin. In this case, the melt tension of the foaming promotion resin may be less than 60% of a melt tension of the base resin. In addition, mixing ratios of the base resin and the foaming promotion resin may range from 100:0 to 30:70, preferably, 80:20 to 40:60. The foaming promotion resin may be selected from low-density polyethylene, linear low-density polyethylene, medium-density polyethylene, high-density polyethylene, polypropylene, or the like. Further, a combination of the base resin and the foaming promotion resin is most preferably a mixture of the low-density polyethylene as a base resin and the linear low-density polyethylene as a foaming promotion resin.

A foaming rate of the open-cell layer 12 preferably ranges from 1.2 to 3.5 times, more preferably, 1.5 to 3.0 times. When the foaming rate of the open-cell layer 12 is 1.2 times or more, thermal insulating properties may be further increased. Also, when the foaming rate of the open-cell layer 12 is 3.5 times or less, workability is improved. Such a foaming rate is calculated according to a ratio of an apparent specific gravity of a film before foaming to that after foaming.

An average bore diameter of the open-cell layer 12 preferably ranges from 150 µm to 500 µm, more preferably, 200 µm to 350 µm. When the average bore diameter of the open-cell layer 12 is not less than the above lower limit, thermal insulating properties may be further increased. When the average bore diameter of the open-cell layer 12 is not more than the above upper limit, fracture of the open-cell layer 12 during manufacturing may be prevented. Meanwhile, an average bore diameter of an opening on the surface of the open-cell layer may be larger than a layer thickness of the open-cell layer itself. Also, in the foam of a closed-cell (independently foamed) layer including bubbles in the layer, among layers to be described in the comparative examples below, a minimum bore diameter of each bubble in a thickness direction does not exceed a thickness of the foam.

The average bore diameter may be calculated by taking an electron micrograph of the surface of the open-cell layer 12 and analyzing the obtained image. In this regard, according to the present invention, the average bore diameter refers to an average value of sizes of the opening on the surface of the open-cell layer, which is a number-average value of the cells having a bore diameter of 100 µm or more.

The thickness of the open-cell layer 12 preferably ranges from 70 µm to 250 µm, more preferably, 100 µm to 200 µm. When the thickness of the open-cell layer 12 is 70 µm or more, thermal insulating properties may be further increased. When the thickness of the open-cell layer 12 is 250 µm or less, flexibility of the thermal insulating packaging film 10 may be further improved. Meanwhile, an actual resin thickness of the foamed layer may be calculated by dividing the thickness of a foamed layer by a foaming rate.

Sealant Layer

The sealant layer 13 is a non-foamed layer that can be heat-sealed. Thermoplastic resin used for forming the sealant layer 13 may include, for example, low-density polyethylene, linear low-density polyethylene, medium-density polyethylene, high-density polyethylene, polypropylene, or the like. Among these, linear low-density polyethylene is preferably used in view of cold resistance and strength.

A thickness of the sealant layer 13 preferably ranges from 10 µm to 200 µm and, more preferably, 20 µm to 100 µm. When the thickness of the sealant layer 13 is 10 µm or more, a sufficient heat-sealing property may be ensured. When the thickness of the sealant layer 13 is 200 µm or less, flexibility of the thermal insulating packaging film 10 may be further improved.

Preparation of Thermal Insulating Packaging Film

The thermal insulating packaging film 10 is prepared by laminating the base material 11, the open-cell layer 12, and the sealant layer.

Although a laminating method of the base material 11 and the open-cell layer 12 may include, for example, dry lamination, extrusion lamination, etc, dry lamination is preferably used, in view of excellent bond strength.

When the lamination is performed by dry lamination, an adhesive used herein may include, for example, a polyurethane adhesive, a polyacryl adhesive, a polyester adhesive, a polyether adhesive, an epoxy resin adhesive, a polyvinyl acetate adhesive, a cellulose adhesive, or the like.

Although a laminating method of the open-cell layer 12 and the sealant layer 13 may include, for example, dry lamination, extrusion lamination, co-extrusion, etc, co-extrusion is preferably used since it requires no binder and can suppress generation of an offensive odor.

More particularly, a method for preparation of the thermal insulating packaging film preferably includes preparing a laminate of the open-cell layer 12 and the sealant layer 13 through co-extrusion, and adhering the base material 11 to the open-cell layer 12 of the laminate through dry lamination.

For example, the open-cell layer 12 may be prepared by processing a polyolefin composition, which contains polyolefin and a foaming agent, into a layer shape, and then heating and foaming the processed layer.

The foaming agent may include, for example, an organic chemical foaming agent to generate nitrogen gas, including azo dye compounds such as azodicarbon amide, barium azocarboxylate or azobisisobutylnitrile compounds, etc., nitroso compounds such as N,N'-dinitrosopenta methylene tetramine, hydrazine compounds such as hydrazocarbon amide, hydrazide compounds such as p-toluenesulfonyl hydrazide, p,p'-oxy-bis(benzenesulfonyl hydrazide), etc.; an inorganic chemical agent to generate carbonic acid gas, such as sodium hydrochloride, ammonium carbonate, ammonium hydrocarbonate, etc.; lower aliphatic hydrocarbon compounds such as propane, n-butane, i-butane, n-pentane, i-pentane, hexane, etc.; alicyclic hydrocarbon compounds such as cyclobutane, cyclopentane, etc.; aromatic hydrocarbon compounds such as benzene, toluene, xylene, etc.; low boiling point halogen hydrocarbon compounds including lower aliphatic mono-valent alcohol compounds such as methanol, ethanol, etc., lower aliphatic ketone compounds such as acetone, methylethylketone, etc., chloromethyl, chloroethyl, 1-chloro-1, 1-difluoroethane, or the like; or a physical foaming agent including gases such as argon gas, helium gas, Freon gas, carbonic acid gas (carbon dioxide gas), nitrogen gas, etc.

Meanwhile, the gas used in the present invention may include subcritical and/or supercritical fluids as well as a fluid in a vapor state.

Among the above foaming agents, in view of suitable use for food, carbon dioxide gas or nitrogen gas is preferably used, and carbon dioxide gas or nitrogen gas in the supercritical state is particularly preferably used.

An added amount of the foaming agent may range from 0.01 parts by weight to 2.0 parts by weight with respect to 100 parts by weight of polyolefin. When the added amount of the foaming agent is 0.01 parts by weight or more, an open-cell layer may be easily formed. Also, when the added amount is 2.0 parts by weight or less, it becomes easy for an average bore diameter to be 500 μm or less.

During foaming, a setting temperature of an extruder may be suitably regulated based on types and/or added amounts of the foaming agent and types of polyolefin.

Functional Effects

Figure 3:
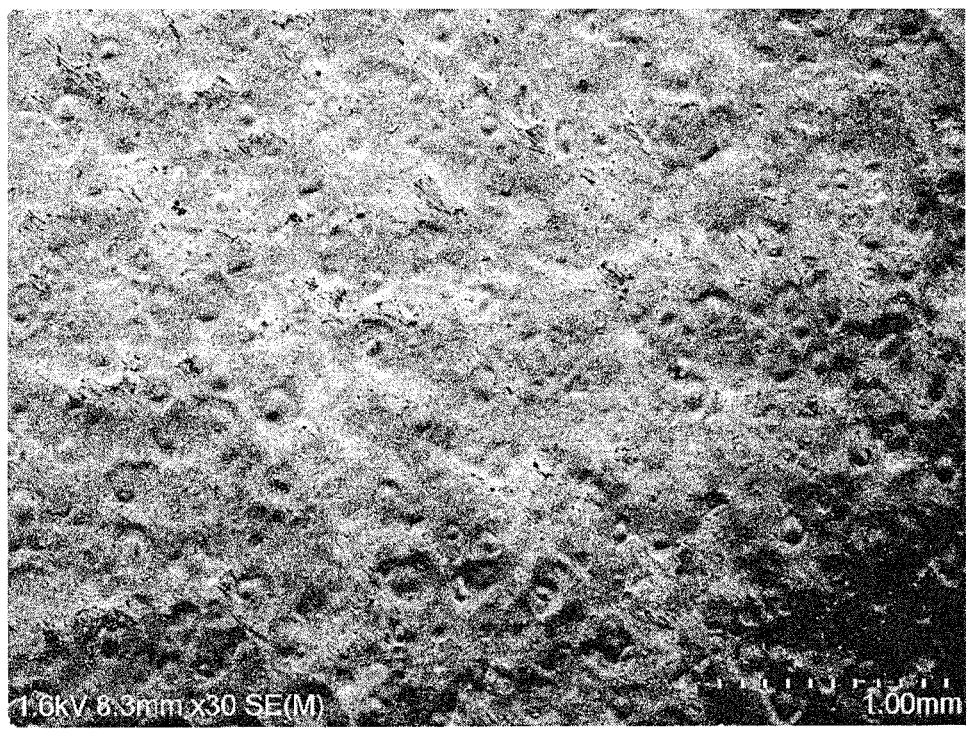
FIG. 3 is an SEM photograph of a closed-cell layer.

The open-cell layer 12 has an opening on the surface thereof and an air layer present in the same layer. Accordingly, a laminate having the open-cell layer 12 includes fine unevenness formed on the surface thereof to conform to a shape of the opening on the surface of the open-cell layer 12, and the air layer formed in an intermediate layer of the laminate. Therefore, synergetic effects of the unevenness and the air layer may enable the laminate having the open-cell layer 12 to exhibit higher thermal insulating effects compared to the closed-cell layer (independently formed) layer described in the comparative examples below. The thermal insulating packaging film 10 having the open-cell layer 12 has a low heat conductivity and sufficiently high thermal insulating properties. As a result of investigations by the present inventor, it was found that the inventive film has improved thermal insulating properties compared to the thermal insulating packaging film using a closed-cell layer shown in the SEM photograph of FIG. 3. Since the thermal insulating packaging film 10 has improved thermal insulating properties, it is possible to easily decrease a thickness and a weight of the same film.

Packaging Bag

Hereinafter, a packaging bag using the thermal insulating packaging film 10 will be described in detail.

The packaging bag of the present exemplary embodiment may be manufactured by heat sealing the thermal insulating packaging film 10. The thermal insulating packaging film 10 is disposed such that the base material 11 becomes a surface of the film while the sealant layer 13 is placed inside the same film.

To manufacture a packaging bag by heat sealing the thermal insulating packaging film 10, for example, a manufacturing method including: overlapping two sheets of thermal insulating packaging films 10 and 10 in a substantially rectangular form to enable the sealant layers 13 and 13 to face each other; and, in this state, using a heat seal bar to execute heat-sealing around an overall periphery of four sides, may be proposed.

Alternatively, another manufacturing method including: folding a single sheet of the thermal insulating packaging film 10 into two layers such that the sealant layers 13 face each other; and, in this state, using a heat seal bar to execute heat-sealing around most of the periphery of three sides except for the folded side, may be proposed.

Alternatively, the thermal insulating packaging film 10 may be heat-sealed to manufacture a packaging bag such that a gusset type bag having lateral sides is formed. That is, a lateral side forming film having a sealant layer disposed on one face thereof is firstly prepared, and then the prepared lateral side forming film is folded into two layers to allow the sealant layer to become an outer side. Next, two sheets of the thermal insulating packaging films 10 and 10 in a substantially rectangular form are overlapped such that the sealant layers 13 and 13 face each other, and the lateral side forming film which was folded is placed between the two sheets of thermal insulating packaging films 10 and 10, to be positioned at the lateral side parts. Then, in this state, heat-sealing is executed around an overall periphery of four sides using a heat seal bar. As a result, a gusset bag is obtained and corresponding faces of the lateral side forming film folded at four edges thereof may be thermally bonded or adhered together.

Packaging Bag Having a Spout

Hereinafter, a packaging bag having a spout formed using the thermal insulating packaging film 10 will be described in detail.

Figure 4:
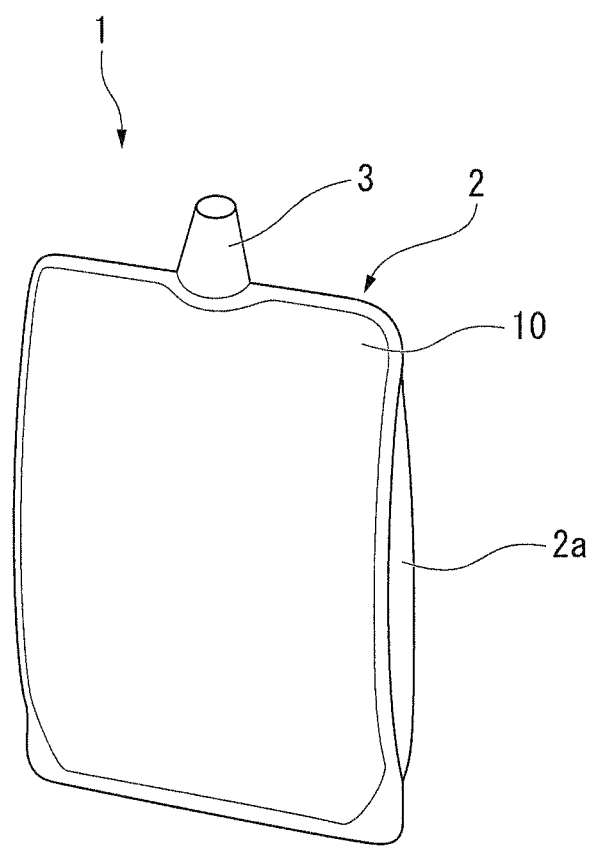
FIG. 4 is a perspective view showing an exemplary embodiment of a packaging bag having an opening member (a spout) of the present invention.

FIG. 4 shows the packaging bag having a spout of an exemplary embodiment of the present invention. The packaging bag 1 having a spout according to a present exemplary embodiment includes a spout 3 attached to a packaging bag 2.

The packaging bag 2 in the present exemplary embodiment is fabricated by heat-sealing the thermal insulating packaging film 10 and may be a gusset bag having lateral side parts 2a.

The spout 3 is a tubular body through which an inner side of the packaging bag 2 communicates with an outer side thereof.

Materials used for fabricating the spout 3 may include, for example, polyolefin, polyamide, polyester, (meth)acryl resin, polyvinyl chloride, polyvinylidene chloride, polyether sulfone, ethylene vinyl alcohol copolymer, or the like. Among these, polyolefin is preferably used since it can be heat-sealed to the thermal insulating packaging film 10.

Examples of polyolefin may include: polyethylene resin such as high-density polyethylene, medium-density polyethylene, high pressure low-density polyethylene, linear low-density polyethylene, ethylene-vinyl acetate copolymer, etc.; olefin elastomer such as ethylene-α-olefin copolymer; polypropylene resin such as polypropylene, ethylene-propylene random copolymer, α-olefin-propylene random copolymer, etc.; or cyclic polyolefin resin. These resins may be mixed or partially cross-linked to improve performance thereof.

The spout 3 may be fabricated using a single material or formed into a multi-layered structure including multiple resin layers.

As a mounting method of the spout 3 in the manufacturing method of the packaging bag, a method including: interposing one end of the spout 3 between the thermal insulating packaging films 10 and 10 at one peripheral edge, followed by heat-sealing the same, may be proposed.

The packaging bag or the packaging bag 1 having a spout including the thermal insulating packaging film 10 attains excellent thermal insulating properties. Therefore, in the case that a frozen dessert is packed in the packaging bag or the packaging bag 1 having a spout, it is possible to prevent hands or fingers of a consumer from being chilled too much when he or she presses the bag with his or her hands or fingers to push the frozen dessert out of the bag 1. Similarly, in the case that hot foods are packed in the packaging bag or the packaging bag 1 having a spout, it is possible to prevent hands or fingers of a consumer from being heated too much when he or she presses the bag with his or her hands or fingers to push the hot foods out of the bag 1.

Other Exemplary Embodiments

The present invention is not particularly limited to the above-described embodiments.

For example, the thermal insulating packaging film of the present invention may further include a functional layer to endow performances such as gas-shielding property, toughness, bending resistance, piercing resistance, impact resistance, abrasion resistance, cold resistance, or the like.

For example, a base material layer, a functional layer, an open-cell resin layer and a sealant layer from the base material layer side may be arranged in this order.

The functional layer may include, for example, metal foil or various plastic films, etc.

Metals used for fabricating the metal foil may include, for example, aluminum, iron, copper, magnesium, etc.

The plastic films may include, for example, a plastic film such as polyethylene, polypropylene, polyethylene terephthalate, polyamide, polyvinyl chloride, polycarbonate, polyacrylonitrile, polyvinyl alcohol, ethylene-vinyl alcohol copolymer, etc.; a plastic film coated with a gas-shielding resin such as polyvinylidene chloride, etc.; or a plastic film deposited with an inorganic substance such as aluminum, silicon oxide, aluminum oxide, magnesium oxide, etc., or the like.

The functional layer may be a single layer or at least two layers or more.

A thickness of the functional layer may range from 6 μm to 30 μm. When the thickness of the functional layer is 6 μm or more, effects of the functional layer may be sufficiently produced. When the thickness of the functional layer is 30 μm or less, the thermal insulating packaging film may have sufficient flexibility.

Furthermore, the sealant layer may be omitted in the thermal insulating packaging film. When the sealant layer is omitted, the open-cell layer may function as the sealant layer.

EXAMPLE

Example 1

Using an air-cooling inflation molding machine capable of forming a two-component double-layer, a laminate including a non-foamed sealant layer having a thickness of 60 μm and an open-cell layer having a thickness of 100 μm was prepared through co-extrusion.

The sealant layer was prepared by melting a linear low-density polyethylene at a temperature of 200° C. and discharging the molten material out of a die of the inflation molding machine.

Also, the open-cell layer was prepared by melting a polyethylene composition, which included 60 parts by weight of low-density polyethylene (melt tension: 190 mN), 40 parts by weight of polypropylene (melt tension: 100 mN) and 1 part by weight of sodium hydrochloride as a foaming agent at a temperature of 200° C., and discharging the molten material out of the die of the inflation molding machine. A foaming rate of the open-cell layer was 2.4 times, and an average bore diameter thereof was 252 μm. Moreover, an actual resin thickness of the open-cell layer was about 41.7 μm.

A bi-axially stretched polyethylene terephthalate film having a thickness of 12 μm was adhered to the open-cell layer of the obtained laminate by dry lamination using a polyester adhesive as a binder, resulting in a thermal insulating packaging film.

Example 2

Using an air-cooling inflation molding machine capable of forming a two-component double-layer, a laminate including a non-foamed sealant layer having a thickness of 60 μm and an open-cell layer having a thickness of 140 μm was prepared through co-extrusion. The sealant layer was prepared by melting a linear low-density polyethylene at a temperature of 200° C. and discharging the molten material out of a die of the inflation molding machine.

Also, the open-cell layer was prepared by melting a polyethylene composition, which included 100 parts by weight of low-density polyethylene (melt tension: 174 mN), 20 parts by weight of linear low-density polypropylene (melt tension: 38 mN) and 0.4 parts by weight of nitrogen gas in a supercritical state as a foaming agent at a temperature of 200° C., and discharging the molten material out of the die of the inflation molding machine. A foaming rate of the open-cell layer was 2.5 times, and an average bore diameter thereof was 275 μm. Moreover, an actual resin thickness of the open-cell layer was about 56 μm.

A bi-axially stretched polyethylene terephthalate film having a thickness of 12 μm was adhered to the open-cell layer of the obtained laminate by dry lamination using a polyester adhesive as a binder, resulting in a thermal insulating packaging film.

Comparative Example 1

Using an air-cooling inflation molding machine capable of forming a two-component double-layer, a laminate including a non-foamed sealant layer having a thickness of 20 μm and a closed-sell layer having a thickness of 140 μm was prepared through co-extrusion.

The sealant layer was prepared by melting a linear low-density polyethylene at a temperature of 200° C. and discharging the molten material out of a die of the inflation molding machine.

Also, the closed-cell layer was prepared by melting a polyethylene composition, which included 100 parts by weight of low-density polyethylene, and 1 part by weight of azodicarbonamide at a temperature of 200° C., and discharging the molten material out of the die of the inflation molding machine. A foaming rate of the closed-cell layer was 1.3 times. A cell of the independently foamed body was not spherical but had a flat shape. The cell of the independently foamed body was not circular in a surface direction, but was stretched in a flow direction to obtain an elliptical form. The independently foamed body had an average bore diameter in a flow direction of 350 μm, an average bore diameter in a width direction of 65 μm, and an average bore diameter in a thickness direction of 15 μm. An actual resin thickness of the closed-cell layer was about 107.7 μm.

A bi-axially stretched polyethylene terephthalate film having a thickness of 12 μm was adhered to the closed-cell layer of the obtained laminate by dry lamination using a polyester adhesive as a binder, resulting in a thermal insulating packaging film.

Comparative Example 2

A bi-axially stretched polyethylene terephthalate film having a thickness of 12 μm was adhered to a sealant layer (a linear low-density polyethylene film) having a thickness of 70 μm by dry lamination using a polyester adhesive as a binder, resulting in a packaging film.

Comparative Example 3

Using an air-cooling inflation molding machine capable of forming a two-component double-layer, a laminate including a non-foamed sealant layer having a thickness of 60 μm and an closed-cell layer having a thickness of 175 μm was prepared through co-extrusion. The sealant layer was prepared by melting a linear low-density polyethylene at a temperature of 200° C. and discharging the molten material out of a die of the inflation molding machine.

Also, the closed-cell layer was prepared by melting a polyethylene composition, which included 100 parts by weight of low-density polyethylene, and 1 part by weight of azodicarbonamide at a temperature of 200° C., and discharging the molten material out of the die of the inflation molding machine. A foaming rate of the closed-cell layer was 1.3 times. A cell of the independently foamed body was not spherical but had a flat shape. The cell of the independently foamed body was not circular in a surface direction, but was stretched in a flow direction to obtain an elliptical form. The independently foamed body had an average bore diameter in a flow direction of 300 μm, an average bore diameter in a width direction of 70 μm, and an average bore diameter in a thickness direction of 20 μm. An actual resin thickness of the closed-cell layer was about 134.7 μm.

A bi-axially stretched polyethylene terephthalate film having a thickness of 12 μm was adhered to the closed-cell layer of the obtained laminate by dry lamination using a polyester adhesive as a binder, resulting in a thermal insulating packaging film.

Assessment

Assessment of thermal insulating properties based on the temperature of the finger surface After cutting each thermal insulating packaging film into pieces having sizes of 80 mm×125 mm and heat-sealing three pieces at a heat-sealing temperature of 180° C., 140 ml of tap water was filled through the remaining unsealed face. Next, the remaining face was also heat-sealed to obtain a packaging bag containing the tap water. The packaging bag was left in a freezer at −18° C. for 24 hours (over one whole day and night).

Thereafter, the packaging bag was taken out of the freezer and held with four fingers other than a thumb, while a 500 g balance weight was placed on the packaging bag. Following this, after placing the packaging bag on the fingers, a surface temperature of the fingers was measured after 5 seconds, 10 seconds, 15 seconds, 20 seconds, 25 seconds and 30 seconds. The surface temperature of the fingers was determined for respective fingers by thermography, after separating the packaging bag from the four fingers. Table 1 shows the measured surface temperature of the fingers. Results shown in Table 1 are average values of the surface temperatures of the four fingers.

TABLE 1

| Time (second) | Surface temperature of fingers (° C.) | | | | |
|---|---|---|---|---|---|
| | Example 1 | Example 2 | Comparative Example 1 | Comparative Example 2 | Comparative Example 3 |
| 5 | 21.0 | 22.5 | 20.9 | 15.2 | 21.1 |
| 10 | 20.8 | 21.8 | 17.2 | 12.4 | 20.7 |
| 15 | 20.8 | 21.5 | 17.0 | 11.2 | 20.8 |
| 20 | 17.9 | 19.5 | 15.9 | 11.2 | 18.1 |
| 25 | 14.1 | 16.8 | 12.6 | 10.8 | 14.0 |
| 30 | 13.9 | 16.5 | 12.6 | 10.8 | 13.8 |

The packaging bag fabricated using the thermal insulating packaging film having an open-cell layer in each of Examples 1 and 2 exhibited a delayed decrease in the surface temperature of fingers and excellent thermal insulating properties.

Meanwhile, the packaging bag fabricated using the thermal insulating packaging film having a closed-cell layer as a thermal insulating packaging film in Comparative Example 1 exhibited a rapid decrease in the surface temperature of fingers.

The packaging bag fabricated by using the packaging film without a thermal insulating layer in Comparative Example 2 had almost no thermal insulating properties.

The packaging bag fabricated using the packaging film in Comparative Example 3 had thermal insulating properties substantially equal to those of Example 1. However, since an actual resin thickness of the foamed layer was 3 times or more that of Example 1, thermal insulating efficiency is considerably inferior to that of Example 1.

That is, Examples 1 and 2 exhibited superior thermal insulating properties and accomplished a great reduction in weight compared to Comparative Examples 1 and 3.

Sensory Test

Similar to the assessment executed using the surface temperature of fingers, a packaging bag containing tap water therein was fabricated and left in a freezer at −18° C. for 24 hours (over one whole day and night). Thereafter, the packaging bag was taken out of the freezer and held by five appraisers to evaluate thermal insulating properties. More particularly, it was scored as '1' when the appraiser felt cold, while it was scored as '3' if cold was not easily felt. Accordingly, evaluation was executed by three stages between 1 and 3. Results of the evaluation are shown in Table 2.

TABLE 2

| Assessment | Example 1 | Example 2 | Comparative Example 1 | Comparative Example 2 | Comparative Example 3 |
|---|---|---|---|---|---|
| 1 | Zero | Zero | Zero | Five | Zero |
| 2 | One | Zero | Four | Zero | Two |
| 3 | Four | Five | One | Zero | Three |
| Total score | 14 | 15 | 11 | 5 | 13 |

The packaging bag fabricated using the thermal insulating packaging film having an open-cell layer in each of Examples 1 and 2 exhibited excellent thermal insulating properties.

Meanwhile, the packaging bag fabricated using the thermal insulating packaging film having a closed-cell layer as a thermal insulating layer in Comparative Example 1 had insufficient thermal insulating properties.

The packaging bag fabricated using the packaging film without a thermal insulating layer in Comparative Example 2 had almost no thermal insulating properties.

The packaging bag fabricated by using the packaging film in Comparative Example 3 had thermal insulating properties substantially equal to those of Example 1. However, since an actual resin thickness of the foamed layer was 3 times or more that of Example 1, thermal insulating efficiency was considerably inferior to that of Example 1.

That is, Examples 1 and 2 exhibited superior thermal insulating properties and accomplished a great reduction in weight compared to Comparative Examples 1 and 3.

INDUSTRIAL APPLICABILITY

The thermal insulating packaging film, packaging bag, and the packaging bag having a spout according to the present invention can achieve sufficiently high thermal insulating properties.

DESCRIPTION OF REFERENCE NUMERALS

1: packaging bag having opening member (spout)
2: packaging bag
3: opening member (spout)
10: thermal insulating packaging film
11: base material
12: open-cell layer
13: sealant layer

The invention claimed is:

1. A thermal insulating packaging film comprising a base material and an open-cell layer which is made of polyolefin disposed on one face of the base material, wherein the open cell layer is formed of a base resin and a forming promotion resin with a relatively low melt tension compared to the base resin and an average bore diameter of an opening of the open-cell layer is larger than a thickness of the open-cell layer.

2. The thermal insulating packaging film according to claim 1, wherein the average bore diameter of the opening in the open-cell layer ranges from 150 μm to 500 μm.

3. The thermal insulating packaging film according to claim 1, wherein a foaming rate of the open-cell layer ranges from 1.2 to 3.5 times and such a foaming rate is calculated according to a ratio of an apparent specific gravity of a film before foaming to that after foaming.

4. The thermal insulating packaging film according to claim 1, comprising a non-foamed sealant layer disposed on the opposite side of the open-cell layer to the base material.

5. The thermal insulating packaging film according to claim 1, wherein a thickness of the open-cell layer ranges from 70 μm to 250 μm.

6. A packaging bag formed by heat-sealing a thermal insulating packaging film comprising a base material and an open-cell layer which is made of polyolefin disposed on one face of the base material, wherein the open-cell layer is formed of a base resin and a forming promotion resin with a relatively low melt tension compared to the base resin and an average bore diameter of an opening of the open-cell layer is larger than a thickness of the open-cell layer.

7. A packaging bag according to claim 6 further including an opening member attached to the packaging bag to communicate an inner side with an outer side thereof.

* * * * *